United States Patent Office 3,377,133
Patented Apr. 9, 1968

3,377,133
PREPARATION OF SODA ASH
Warren Standish Miller, Fullerton, Calif., assignor, by mesne assignments, to Intermountain Research & Development Corporation, Cheyenne, Wyo., a corporation of Wyoming
No Drawing. Filed Dec. 13, 1963, Ser. No. 330,272
5 Claims. (Cl. 23—63)

ABSTRACT OF THE DISCLOSURE

An improved method for operating concurrent flow horizontal rotary flighted calciners at maximum heat transfer rates with small particle size feed and recycle material.

---

The heat transfer rates in direct contact heaters are directly proportional to the amount of surface of the solids contacting the heating gas. In rotary flighted heaters or calciners the solids being heated are lifted by the flight and are showered through the heating gas to the bottom of the heater where they are again lifted by the flights. The major portion of the heat transfer is effected during the brief periods of time in which the solids are falling through the heating gas and therefore if the lifting flights are full, a maximum transfer rate is obtained because the amount of solids being showered through the heating gas is at its maximum. However, if the solids are of small particle size or light weight they are carried forward by the velocity of the heating gas, only a small amount of the solids drop on to the next flight and the flights are only filled to a fraction of their capacity. If the velocity of the heating gas is reduced, insufficient heat is supplied to accomplish the calcining except at low production rates.

The concurrent flow rotary flighted calciners have worked reasonably well with relatively large particles, coarser than about 10 mesh but when particles smaller than 10 mesh are treated in concurrent flow calciners, they tend to be carried along by the flow of the heating gas so that the flights are not full and the heat transfer rate suffers a decline. The smaller particles, usually called dust, may be carried along so much by the gas stream that they never drop to the bottom of the calciner to be relifted by the flights but instead are carried directly to the exit end of the gas stream. Therefore, up to now maximum heat transfer in rotary flighted calciners has been obtained only with relatively large particles and with a relatively low gas velocity.

It is an object of the present invention to increase the output capacity of rotary flighted calciners.

It is another object of this invention to provide a novel method of obtaining maximum heat transfer rates in concurrent flow rotary flighted calciners with small particles.

It is another object of the invention to provide a novel method for operating concurrent flow rotary flighted calciners with full flights when heating small particles.

These and other objects and advantages of the invention will become obvious from the following detailed description.

The novel method of the invention for obtaining maximum heat transfer rates in concurrent flow rotary flighted calciners comprises feeding to the said calciners a feed stream of particles which have a mesh range of less than 8, preferably 16 mesh to 140 mesh, as they pour from the flights of the calciner and recycled product from the discharge end in an amount up to that required to maintain the flights substantially full, recycling a portion of the product stream to the feed end of the calciner and recovering the remainder of the product stream. A preferred ratio of recycle product to feed is at least 2:1 by weight.

The novel method of the invention results in an unexpected large increase in the heat transfer rate per unit of calciner volume and this increase may be a factor as great as 2 to 5. Due to the higher heat transfer rates obtained by recycling the product, the use of higher gas flow velocities becomes economical and the higher velocities result in a proportional increase in capacity of a calciner of a given size or alternatively a smaller calciner with recycle may be used to calcine a given amount of solid feed material than with a calciner without recycle.

The unexpected increase in the heat transfer rate per unit of calciner volume by the method of the invention is also due to the increased surface of particles exposed to the heating gas. In calcining and drying process, a portion of the heat applied to the material increases its temperature and the remainder of the heat is used by the evaporation of moisture and by chemical reactions which absorb heat. Usually the increase in temperature represents a minor part of the total heat applied.

Since the recycled particles have already been dried and reacted, they cannot use heat for drying or reaction and it could be expected that they would soon increase in temperature until their temperature became close to that of the heating gas whereupon transfer of heat to them would cease. However, this does not occur and the unexpected increase in heat transfer which is observed may be explained in the following way.

Particles of recycled material increase in temperature more than particles of feed material of similar size when the two types of particles are dropped from a flight the same distance through the heating gas. They have absorbed the same amount of heat. All of the heat absorbed by the recycle particle increases its temperature but part of the heat absorbed by the feed particle is used for drying and/or chemical reaction. After each drop the heat absorbed by the recycle particle is transferred to the cooler feed particles while they are in intimate contact with each other at the bottom of the calciner and in the flights as they are being lifted. Having transferred the heat absorbed during the drop to the feed material while in the bottom and rising in the flights, the recycle particles are cool enough to absorb heat again during the next drop and the process is repeated until the exit is reached.

The time of fall through the hot gas is much less than the time the particles are in contact at the bottom of the calciner and while rising in the flights. Thus, the lifting time for a 16 mesh particle of sodium sesquicarbonate is approximately 10.5 times the falling time, and the lifting time for a 100 mesh particle of sodium sesquicarbonate is approximately 7.5 times the falling time in a typical 10 ft. diameter flighted calciner. It is obvious, therefore, that the amount of heat transferred from the recycle product to the feed product during the lifting time will substantially increase the efficiency of the calciner.

The mesh size is determined as of the time that the particles pour from the flights rather than by screening because when particles have even a small amount of liquid film on their surface and for other reasons they will pour as agglomerates rather than separate particles. When agglomerates are showered through the heating gas they are carried along less and heated less than if they were showered as individual particles. In other words, the agglomerates behave as a larger particle.

While the feed stream is preferably composed of particles having a mesh range of less than 8, feed streams may be used which also include particles greater than 8 mesh. For example, the improved results of the invention are obtained when the feed stream consists of only 25% of particles having a mesh range of less than 8.

The rate that heat will be transferred to an individual particle falling through a hot gas is expressed by the following fundamental formula attributed to McAdams:

$$U_s = \frac{.04(G_r)^{0.52}}{D_p^{0.48}}$$

wherein $U_s$ is the heat transfer rate expressed in B.t.u./ (hr.) (° F. mean temperature difference between the gas and the solid) (square feet of surface of the particle), $G_r$ is the average mass velocity of the gas relative to the particle or 3600 times density of the gas in pounds per cubic foot times average velocity in feet per second of the gas relative to the particle and $D_p$ is diameter of the particle in feet.

It should be noted that the surface per unit of mass of small particles is greater than the surface of larger particles. The fall of small particles through the gas will be retarded more by the gas than the fall of larger particles and therefore the small particles will be carried further along by the gas than larger particles.

The heat transfer rate per unit of calciner volume ($U_v$) may be calculated for any particle size from the $U_s$ value and knowledge of the amount of particles that are showered through the gas. Since the purpose of the flights in a rotary calciner is to lift the particles and shower them through the hot gas, $U_v$ will be proportional to the amount of material showered by the flights.

Table I shows $U_v$ (the heat transfer rate per unit of calciner volume) when sodium sesquicarbonate crystals of varying sizes is calcined to soda ash with different gas velocities with no recycle of the product and Table II shows the same heat transfer rates when 2.88 pounds of final product are recycled for each pound of sodium sesquicarbonate feed material. Similar increases in heat transfer rates occur in the calcining or drying of sodium carbonate monohydrate, sodium bicarbonate, anhydrous sodium carbonate, etc.

The calciner used to obtain the data in Tables I and II was 10 feet in diameter with a 75 sq. ft. net cross section and had 40 flights each 36 feet long. The heated gas which flowed concurrently with the particles through the calciner had an average molecular weight of 28.4 and an average gas density of 0.0175 pounds per cubic foot. The average temperature of the gas was 1300° F. and the average pressure was 600 mm. of Hg.

With a rotation of 4 revolutions per minute and an average distance of fall of 7 feet, the calculated time of fall for sodium sesquicarbonate crystals

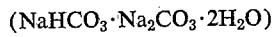

(NaHCO$_3$·Na$_2$CO$_3$·2H$_2$O)

in the calciner was 0.66 second for 4 mesh crystals, 0.71 second for 16 mesh crystals, 1.0 second for 60 mesh crystals and 1.55 seconds for 100 mesh crystals. Since the average lifting time was 7.5 seconds, the ratio of lifting time to falling time is 10.5 for the 16 mesh crystals and 7.5 for the 100 mesh crystals.

The carry-along of the 60 mesh crystals per fall was calculated to be 12.3 feet with a heating gas velocity of 20 feet per second when the density of the crystals was 0.0175 pound per cubic foot. The crystals were assumed to be exposed to the full momentum of the gas flow during their fall.

TABLE I.—HEAT TRANSFER HIGH STAGE, NO RECYCLE

| Gas Velocity, ft./sec. | Tons of gas per hr. | Capacity, tons soda ash per hr. | Heat Transfer, B.t.u./hr. ° F. cu. ft. | | | | | |
|---|---|---|---|---|---|---|---|---|
| | | | 100 mesh crystals | 60 mesh crystals | 30 mesh crystals | 16 mesh crystals | 8 mesh crystals | 4 mesh crystals |
| 5 | 11.95 | 5.67 | 34.5 | 31.8 | 22.6 | 14.4 | 7.5 | 3.1 |
| 10 | 23.9 | 11.34 | 32.5 | 27.5 | 20.3 | 14.6 | 10.8 | 5.4 |
| 20 | 47.8 | 22.7 | 32.4 | 26.1 | 17.1 | 13.3 | 11.5 | 5.9 |
| 41.4 | 99 | 47 | 34.0 | 26.4 | 16.3 | 11.4 | 10.1 | 7.8 |

TABLE II.—HEAT TRANSFER HIGH STAGE—2.88 RECYCLE

| Gas Velocity, ft./sec. | Tons of gas per hr. | Capacity, tons soda ash per hr. | Heat Transfer, B.t.u./hr. ° F. cu. ft. | | | | | |
|---|---|---|---|---|---|---|---|---|
| | | | 100 mesh crystals | 60 mesh crystals | 30 mesh crystals | 16 mesh crystals | 8 mesh crystals | 4 mesh crystals |
| 5 | 11.95 | 5.67 | 134 | 123 | 87 | 40 | 13.6 | 3.1 |
| 10 | 23.9 | 11.34 | 126 | 107 | 79 | 44 | 15.4 | 5.4 |
| 20 | 47.8 | 22.7 | 126 | 101 | 66 | 52 | 18.8 | 5.9 |
| 41.4 | 99 | 47 | 132 | 103 | 63 | 44 | 25 | 7.9 |

A comparison of the data of Tables I and II shows that the heat transfer rate in the calciner is greatly increased by recycling the product material for all particles smaller than about 8 mesh at low heating gas velocities and for all particles smaller than about 4 mesh at a heating gas velocity of 41.4 feet per second. For example, at the recycle ratio of 2.88 to 1 the heat transfer to 100 mesh crystals was increased from 34.5 to 134 at a gas velocity of 5 ft./sec., a substantially 4-fold increase and at a gas velocity of 41.4 ft./sec., the increase in heat transfer to 100 mesh crystals was of the same order. The ratio of pounds of solids per pound of heating gas for Tables I and II is 1.84.

The loading ratio of solids to gas velocity as seen by comparing Column 1 and Column 3 of Table I is approximately 1:1; however, in Table II with a 2.88 recycle the amount of solids passing through the calciner is approximately four times the amount passing through the calciner in Table I, thus providing a loading ratio of solids to gas velocity of approximately 4:1. This results in fuller flights and more contact of the heated recycle product with the feed product in the bottom of the calciner and during the lifting, with the advantages previously pointed out.

The effect of the higher heat transfer rate obtained by the use of recycle is to reduce the length of the calciner that is required to achieve the specified terminal temperatures. For a given cross section, gas velocity, and terminal temperatures, the length required is inversely proportional to $U_v$. Prior to this invention, the higher gas velocities of the magnitude of the 41.4 ft./sec. shown in the bottom line of Tables I and II were not used because an excessively long calciner would be necessary to transfer the heat. The excessive length results in excessive cost for the equipment. By the use of the recycle of this invention, the length of the calciner may be reduced by a factor of approximately 4. This reduction in length reduces the cost of the calciner so that it becomes economical to use high gas velocities and obtain the higher production capacity that results from the higher gas velocities.

To demonstrate the increase in heat transfer rate by the use of recycle product according to the invention, a plant test was conducted with a sodium sesquicarbonate calciner substantially as described above wherein the amount of recycle product carried from 0 to 3 pounds of recycle product per pound of feed material. The heat transfer rate at a recycle of 3 pounds of recycle per pound of product was 3.6 times greater than the heat transfer rate without recycle.

Various modifications of the method may be made without departing from the spirit or scope thereof and it is to be understood that the invention is intended to be limited only as defined in the appended claims.

I claim:

1. The method of increasing the heat transfer rate from a heated gas to solid particles to be calcined in the particle size range of less than 8 mesh in a rotary flighted concurrent flow direct fired calciner which comprises increasing the amount of solids per unit of heating gas by recycling heated product from the discharge end of the calciner to the feed end of the calciner and maintaining a ratio of recycle product to feed product of at least 2:1.

2. The method of increasing the production of finished product of a particle size of less than 8 mesh from a rotary flighted concurrent flow direct fired calciner which comprises maintaining a feed rate for the material to be calcined, which is proportional to the gas velocity through the calciner, and increasing the rate of heat transfer from the gas to the solid particles by recycling finished heated product through the calciner at a ratio of 2 parts recycle product to 1 part feed material, and recovering finished product equivalent to the amount of feed material fed into the calciner.

3. The method of calcining feed material of a particle size of less than 8 mesh to finished product in a rotary flighted calciner in which the heating gas and feed material flow concurrently through the calciner, which comprises recycling "heated finished product" from the discharge to the feed end of the calciner in the ratio greater than 2 parts "finished product" to 1 part feed material to be calcined to keep the flights of the conveyor substantially filled with solids, dropping the solids from the flights at the top of the calciner through the heating gas to impart more heat to the "recycle finished product" than to the feed material and utilizing the time the heated recycle product and the feed material are in contact at the bottom of the calciner and during lifting on the flights to impart heat from the recycle finished product to the feed material.

4. The method of producing soda ash from sodium sesquicarbonate filter cake which comprises feeding the "moist sodium sesquicarbonate filter cake" into a rotary flighted calciner, flowing heated gas concurrently through said calciner and increasing the rate of heat transfer from said gas to the sodium sesquicarbonate particles by recycling heated soda ash from the discharge of said calciner through the said calciner in the ratio of more than 2 parts heated recycle soda ash to 1 part sodium sesquicarbonate feed material and removing from the recycle stream an amount of soda ash equivalent to the amount of sodium sesquicarbonate fed into said calciner.

5. The method of producing soda ash from materials of the group consisting of hydrated and moist sodium carbonate containing filter cake which comprises feeding the moist filter cake into a rotary flighted calciner, flowing heating gas concurrently through said calciner and increasing the rate of heat transfer from said gas to the hydrated and moist sodium carbonate particles by recycling heated soda ash from the discharge of said calciner through the said calciner in the ratio of more than 2 parts heated recycle soda ash to 1 part hydrated and moist sodium carbonate feed material and removing from the recycle stream an amount of soda ash equivalent to the amount of hydrated and moist sodium carbonate fed into said calciner.

References Cited

UNITED STATES PATENTS

| | | | |
|---|---|---|---|
| 386,664 | 7/1888 | Solvay | 23—63 X |
| 658,727 | 9/1900 | Naef | 23—63 X |
| 1,924,905 | 8/1933 | Bourdet | 263—53 X |
| 2,459,414 | 1/1949 | Carrier | 23—63 |
| 3,189,408 | 6/1965 | Miller | 23—63 |
| 3,258,849 | 7/1966 | Raitt | 43—102 |

OTHER REFERENCES

Perry: "Cemical Engineers' Handbook," 3d ed., McGraw-Hill (1950), pp. 828 and 829.

EDWARD J. MEROS, *Primary Examiner.*

OSCAR R. VERTIZ, *Examiner.*

G. T. OZAKI, *Assistant Examiner.*